United States Patent [19]

Tong et al.

[11] Patent Number: 4,953,027

[45] Date of Patent: Aug. 28, 1990

[54] OSD IN A TV RECEIVER INCLUDING A WINDOW, SMOOTHING AND EDGE ENHANCING

[75] Inventors: Hing Y. Tong, Tsuen Wan; Tak M. Kwan, Wanchai; Gerald K. Lunn, Harbour City, all of Hong Kong

[73] Assignee: Motorola Inc., Schaumburg, Ill.

[21] Appl. No.: 341,879

[22] Filed: Apr. 24, 1989

[51] Int. Cl.[5] .................... H04N 5/44; H04N 5/272; H04N 7/01; H04N 7/94
[52] U.S. Cl. .................................. 358/188; 358/22; 358/183; 358/140
[58] Field of Search ................. 358/188, 140, 22, 181, 358/182, 183; 340/728, 734

[56] References Cited

U.S. PATENT DOCUMENTS

| | | | |
|---|---|---|---|
| 4,345,243 | 8/1982 | Parsons | 340/728 |
| 4,467,360 | 8/1984 | Fosse | 358/198 |
| 4,611,226 | 9/1986 | Buhse et al. | 358/144 |
| 4,661,844 | 4/1987 | Rufray et al. | 358/23 |
| 4,682,209 | 7/1987 | Nilleson | 358/23 |
| 4,802,009 | 1/1989 | Hartmeier | 358/140 |
| 4,837,562 | 6/1989 | Nishiura et al. | 340/728 |

Primary Examiner—John K. Peng
Attorney, Agent, or Firm—Michael D. Bingham

[57] ABSTRACT

A TV receiver including a microprocessor and an on screen display on a single semiconductor chip. The OSD includes half dot logic and shifting to smooth the characters with a minimum of storage capacity required and the half dot logic is used in an edge enhancing circuit to generate a black surround. A simplified window generator is combined therewith to further improve the characters.

16 Claims, 11 Drawing Sheets

OSD IN A TV RECEIVER INCLUDING A WINDOW, SMOOTHING AND EDGE ENHANCING

The present invention pertains to a television receiver including a microprocessor (MPU) and an on screen display (OSD) and more particularly to a multistandard OSD including character smoothing and edge enhancing and to window generation.

BACKGROUND OF THE INVENTION

In prior art television receivers an MPU is utilized to control all of the functions, e.g. color, synchronization, etc. An additional chip, which contains all of the OSD circuitry, is coupled to the MPU and provides any on screen displays. Each prior art OSD chip is designed to operate with a specific television receiver, that is, it operates at one specific standard. Typical world standards in the television industry include NTSC, PAL, and SECAM. Further, there are many variations on each of these standards, referred to herein as multidefinitions, which multidefinitions include: Improved definition TV (IDTV); extended definition TV (EDTV); high definition TV (HDTV); as well as interlace scan and progressive scan.

Because each chip operates on only one standard, the frequencies within the chip are constant and it is relatively simple to provide features such as windows and smooth characters. However, even with constant frequencies a large amount of storage space is required to store smooth characters and enhanced edges. Further, window generation requires a relatively large amount of circuitry and does not allow such inovations as a window within a window.

SUMMARY OF THE INVENTION

It is an object of the present invention to provide new and improved character smoothing cicuitry and methods.

It is a further object of the present invention to provide new and improved character smoothing circuitry and methods with edge enhancing capabilities.

It is a further object of the present invention to provide new and improved window generating circuitry and methods.

These and other objects of this invention are realized in a television receiver having a microprocessor and multistandard OSD circuitry for generating a preselected display coupled to said microprocessor and including half dot shift means for character smoothing in the display. The OSD circuitry further includes edge generating means coupled to said half dot shift means for at least partially surrounding characters with a predetermined edge.

The invention further includes window generating circuitry including a comparator for comparing the actual column count to a preselected window address and generating a window signal each time they compare.

BRIEF DESCRIPTION OF THE DRAWINGS

Referring to the drawings, wherein like characters indicate like parts throughout the figures.

DETAILED DESCRIPTION OF THE PREFERRED EMBODIMENT

Figure 1:
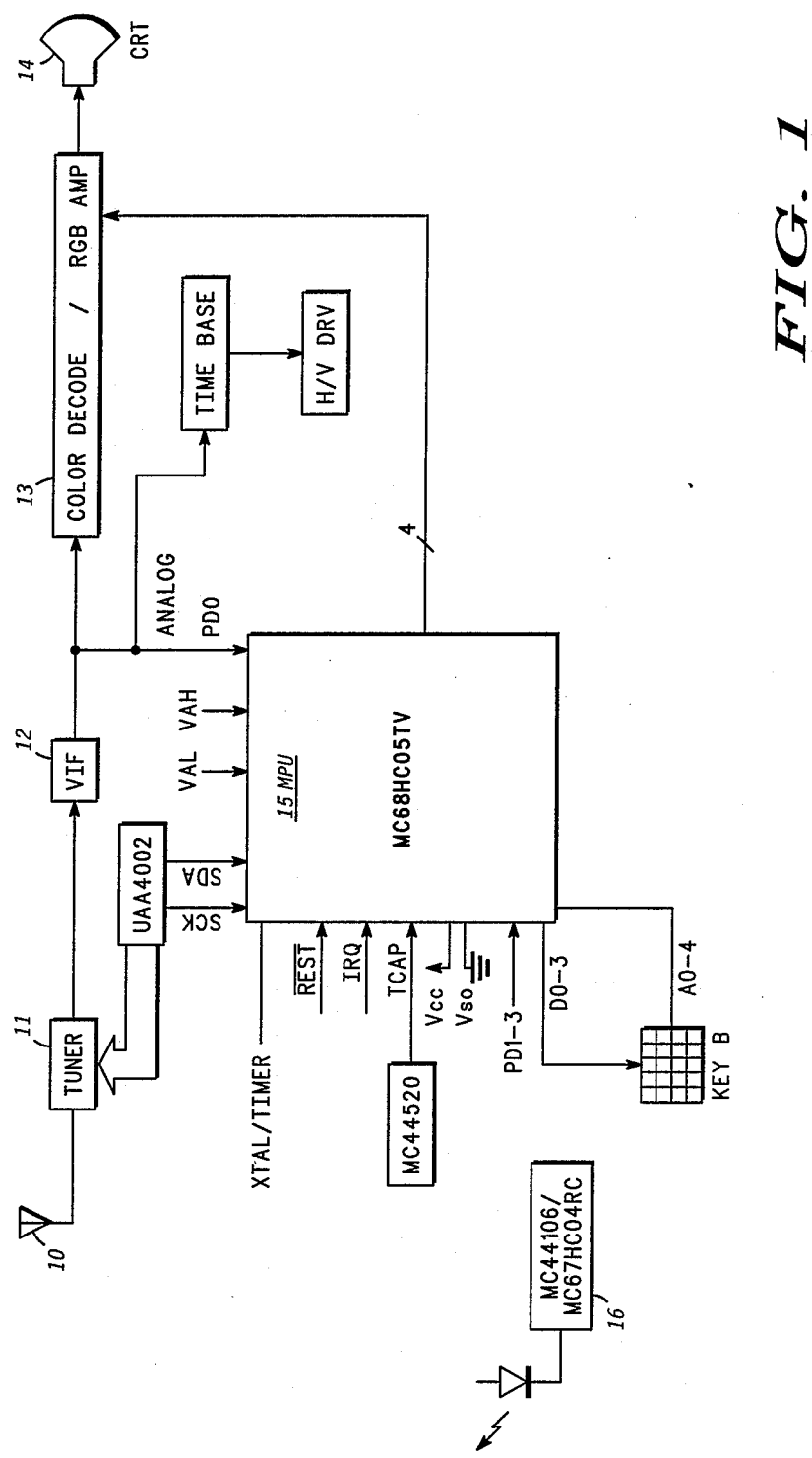
FIG. 1 is a block/schematic diagram of a television receiver embodying the present invention.

Referring specifically to FIG. 1, a multistandard television receiver is illustrated embodying the present invention. Throughout this description, the term "multistandard" refers to the various world standard television systems (e.g. NTSC, PAL, SECAM, etc.) as well as any or all of the various multidefinition systems (e.g. IDTV, EDTV, HDTV, interlace scan, progressive scan, etc.). It is of course well known in the TV field that pictures or screens are produced by generating a plurality of fields per second with each field being defined by vertical pulses (vertical frequency) having a fixed number of horizontal sweeps (horizontal frequency) therebetween An on screen display is composed of dots positioned in horizontal lines and vertical columns. Each dot in each pixel has a specific address and is positioned in one of the horizontal lines and vertical columns and each pixel is addressed by vertical columns and horizontal rows. The addresses are used to generate the desired display. While the above nomenclature will be used throughout this description it should be understood that this is simply for convenience of description and is not intended to limit the invention in any way.

The television receiver includes an antenna 10, a tuner 11, IF strip 12, color decoder 13, CRT 14, and MPU 15. AS is well known in the art, MPU 15 controls the channel (or operating frequency), the color of the picture, and all other controllable features such as brightness, volume, etc A remote unit 16 communicates with MPU 15 for remote control of many controllable features. Only the basic components are illustrated in FIG. 1 and many well known peripheral components have been omitted for simplicity.

Figure 2:
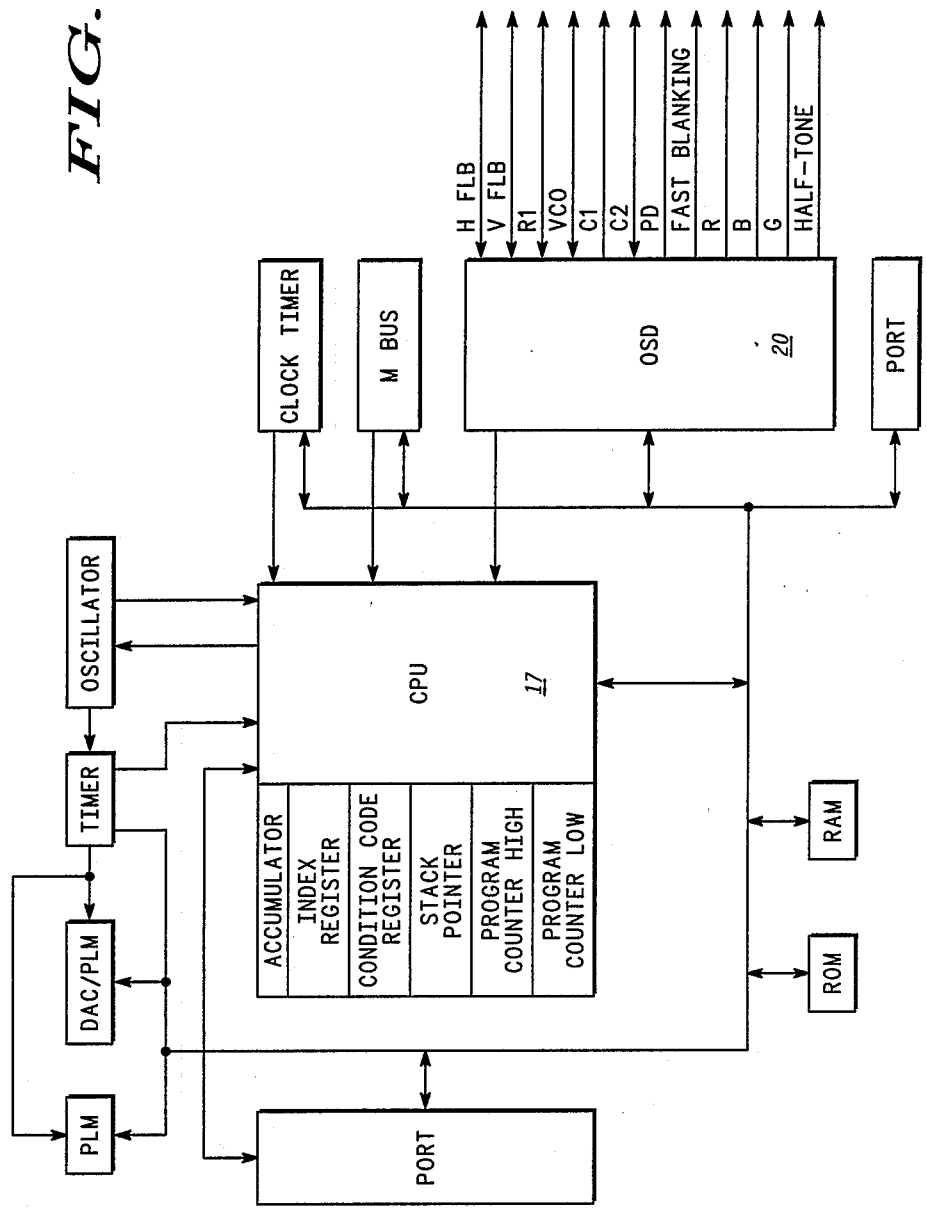
FIG. 2 is a more detailed block diagram/flow chart of the improved microprocessor illustrated in FIG. 1.

FIG. 2 illustrates a more detailed block diagram of MPU 15 with the various components, which in this specific embodiment are all formed on a single chip. FIG. 2 also illustrates inputs and outputs to MPU 15, many of which will not be described in detail herein because they are well known to those skilled in the art. The main components to be discussed herein are a CPU 17 and specific cicuitry within the multistandard on screen display (OSD) circuitry 20.

Figure 3:
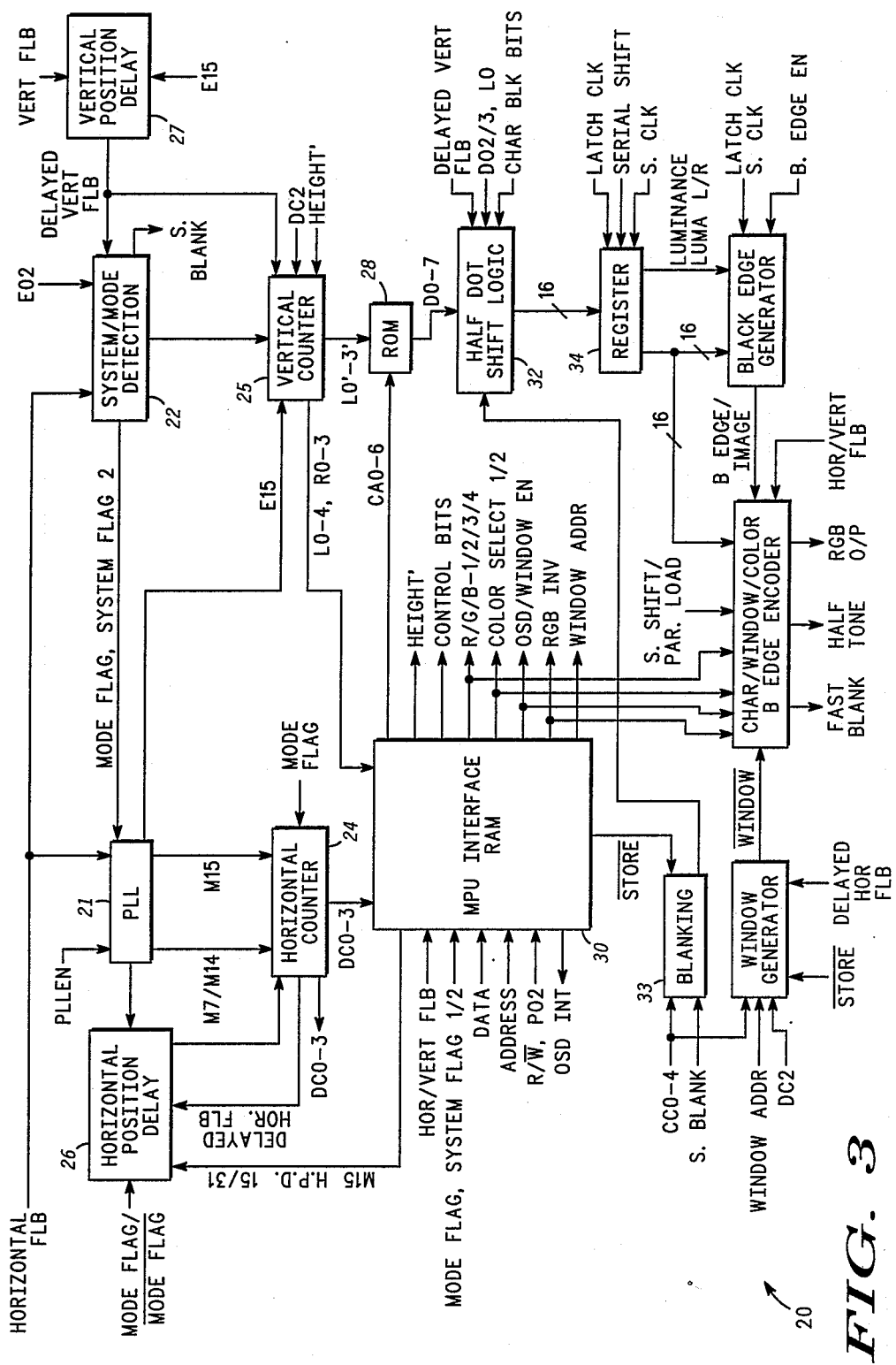
FIG. 3 is a more detailed block diagram/flow chart of the OSD circuitry of FIG. 2.

A more detailed block diagram of multistandard OSD circuitry 20 is illustrated in FIG. 3. Two copending patent applications entitled "TV RECEIVER INCLUDING MULTISTANDARD OSD" and "MULTISTANDARD OSD IN A TV RECEIVER INCLUDING DISPLAY POSITIONING", filed of even date herewith and assigned to the same assignee, describe the operation of OSD circuitry 20 in more detail. Circuitry 20 includes a phase-looked loop (PLL) 21, a system/mode detection circuit 22, horizontal and vertical counters 24 and 25, respectively, horizontal and vertical position delay circuits 26 and 27, respectively, 64 character read-only-memories (ROMs) 28, an MPU interface 30, half dot shift logic circuits 32, blanking circuits 33, 16 bits shift register 34, character and window color encoder 35, and window generator 36. PLL 21 is utilized to synchronize OSD circuitry 20 to any received standard television signal. In the present embodiment the leading edge of the horizontal flyback pulse portion of a received television signal is used to synchronize PLL 21 to the received television signal. The horizontal flyback pulse is also supplied to system/mode detection circuit 22. Master clock signals and horizontal frequency signals from PLL 21 are supplied to horizontal counter 24. A third signal synchronized to the horizontal flyback pulses is applied to the vertical counter 25 and MPU interface 30 from PLL 21. System/mode detection circuit 22 supplies flags (e.g. mode flag) to PLL 21, horizontal and vertical counters 24 and 25, and MPU interface 30. Horizontal counter 24 supplies dot and vertical column addresses to horizontal position delay circuitry 26, MPU interface 30, and other portions of the circuitry not shown herein. Vertical counter 25 supplies horizontal line and horizontal row addresses to character ROMs 28 and MPU interface 30. Vertical position delay circuitry 27 receives vertical flyback pulses from the standard television signal and supplies a delayed vertical flyback signal to system/mode detection circuit 27 and to vertical counter 25.

In the present embodiment, for purposes of explanation, it will be assumed that each character is formed from a seven by nine dot matrix. Further, each dot is formed by two horizontal pulses in two adjacent horizontal sweeps. The two horizontal pulses, along with the same two positions in all following horizontal sweeps, define a vertical column and the two horizontal sweeps define a horizontal line. Thus, the dots are in horizontal lines and vertical columns and each dot in a screen can be addressed accordingly. Two adjacent horizontal pulses in a single sweep are a half dot (in the horizontal direction) and two horizontal pulses vertically adjacent in different horizontal sweeps (a horizontal line) are a half dot (in the vertical direction).

In FIG. 3, one of the 64 character ROMs 28 is selected by a character address from MPU interface 30 and the data stored in each ROM 28 is addressed by half dot line addresses generated by vertical counter 25. The data from the selected character ROM 28 is supplied to half dot shift logic 32 along with a reset pulse from blanking circuit 33, a delayed vertical flyback pulse from circuit 27, dot address bits 2 and 8 (DC2/3) from horizontal counter 24, the first bit in the line address (L0) from vertical counter 25, and character blanking bits for timing purposes. The data output signals from logic circuit 32 are supplied to 16 bits shift register 3 along with a latch clock signal, a serial shift signal and a shift clock signal. The output of shift register 34 is a luminance signal which is applied to encoder 35 along with a window signal from window generator 36, first and second color select signals and an output enable. Encoder 35 provides output signals to the red, green and blue color amplifiers, an inverted fast blanking signal and half tone color signals to color decoder 13 (see FIG. 1). These functions will be described in more detail with reference to the remaining Figures.

Referring specifically tp FIG. 1, MPU interface 30 is illustrated schematically. Primarily, interface 30 includes a line of twenty five buffer RAMs 39A through 39Y, a line of twenty five storage RAMs 40A through 40Y coupled to receive data from the buffer RAMs, an input data address decoder 42 coupled to receive address information from CPU 17, and an output data address decoder 43 coupled to receive line, column and row address information from horizontal and vertical counters 24 and 25. Since decoders 42 and 43 are not a part of this invention and the function thereof is self explanatory, a detailed explanation of these circuits will not be given.

Figure 4A:
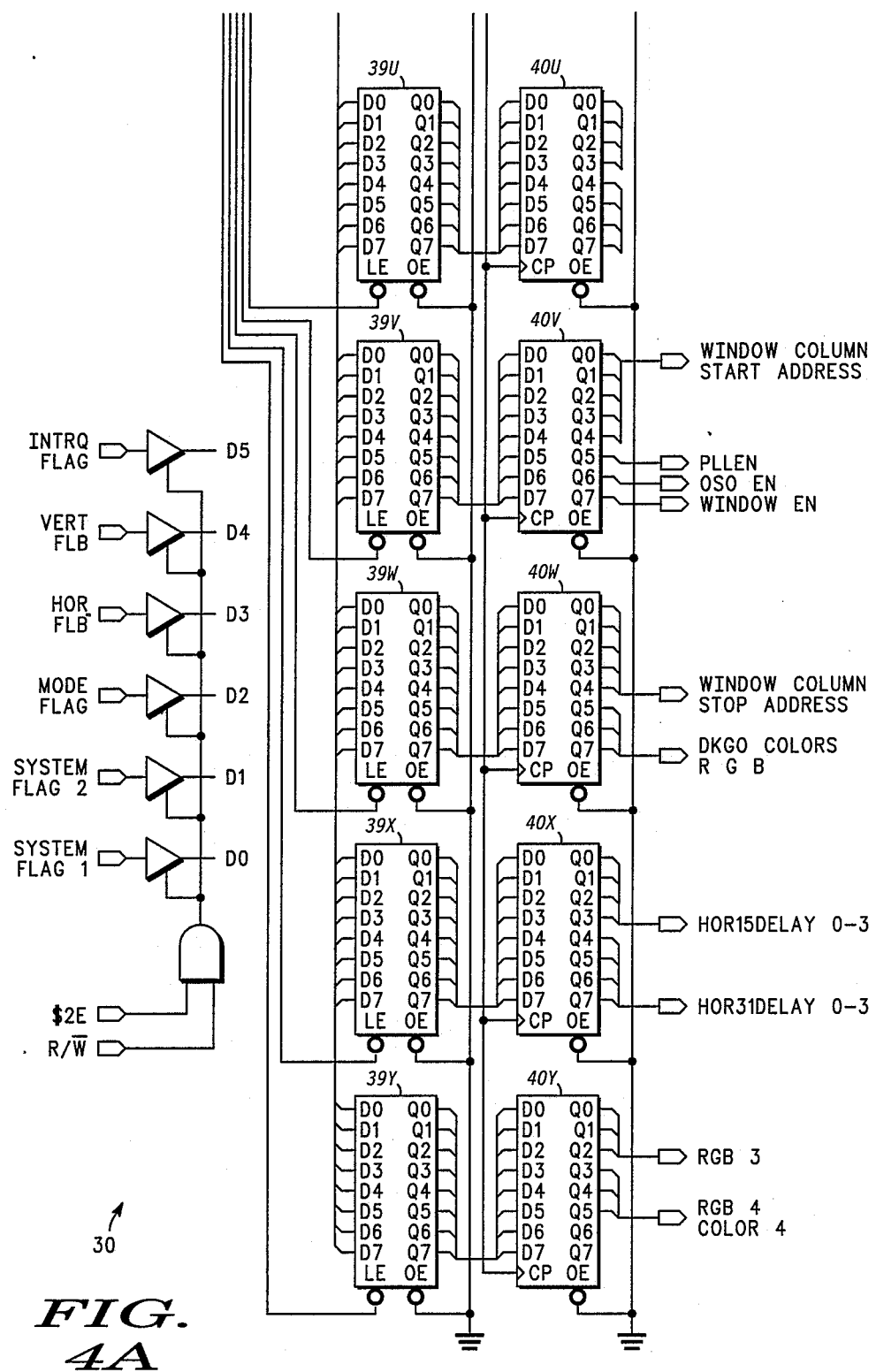
FIG. 4 is a schematic diagram of the MPU interface portion of FIG. 3.
Figure 4B:
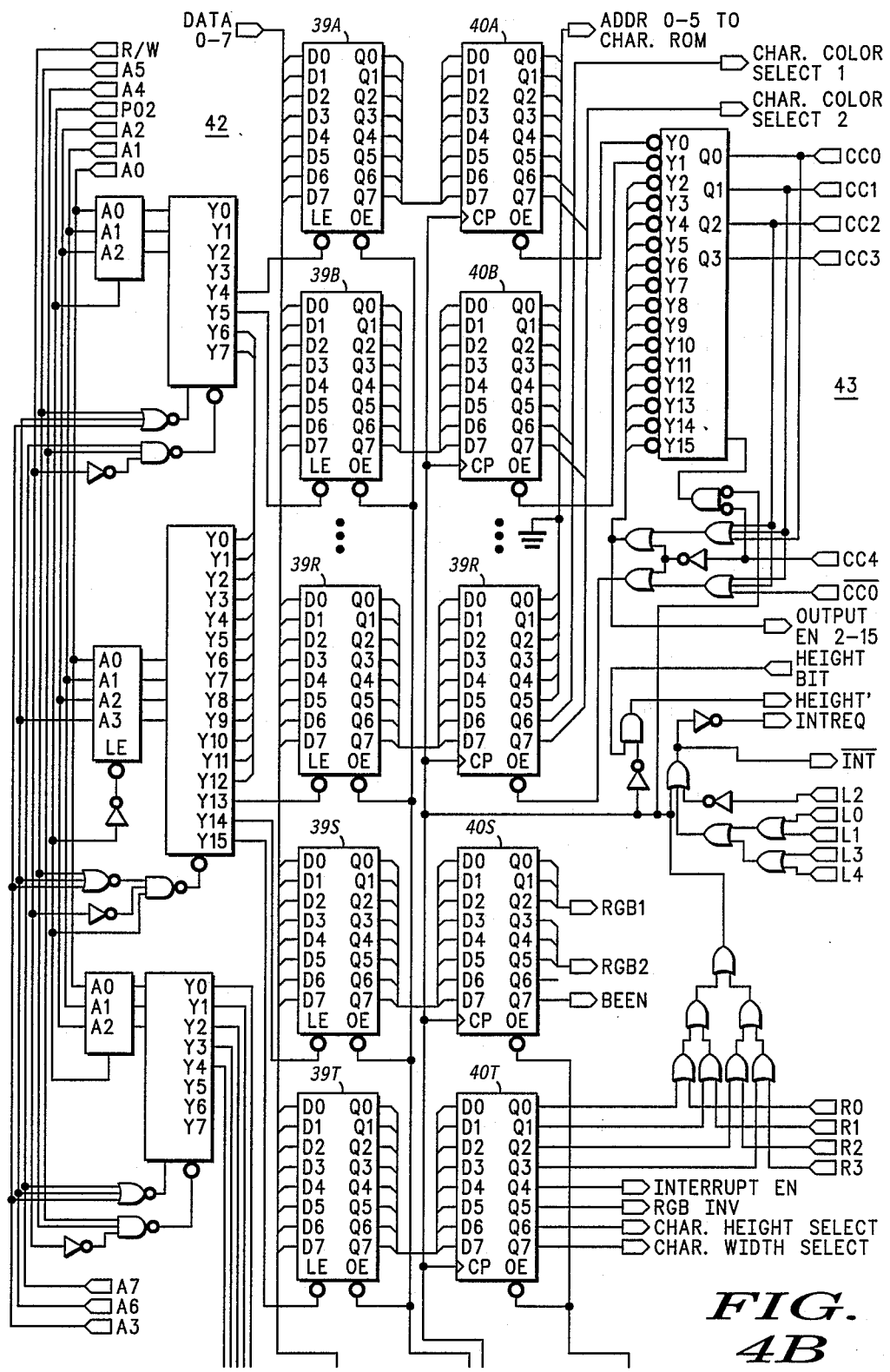

In this specific embodiment of the present invention, the display is capable of producing eighteen characters horizontally across the screen by ten characters vertically down the screen. Each character is formed in a block which for purposes of this explanation will be seven dots wide by nine dots high. In actual practice the blocks include additional dots for spacing from adjacent blocks and there are some minor variations in the width and length for different television standards. These differences are accommodated by flags and vertical and horizontal flyback signals applied to the data bus as illustrated in FIG. 4. Interface 30 operates by receiving, from registers associated with CPU 17, one horizontal line of data into buffer RAMs 39 and then shifting the next horizontal line of data into buffer RAMs 39 as the first horizontal line of data is shifted out of buffer RAMs 39 and into storage RAMs 40. The data is shifted out of storage RAMs 40 to the following processing circuitry as the next horizontal line of data from buffer RAMs 89 is shifted into storage RAMs 40. A single row memory map architecture is adopted in this embodiment instead of the full screen display RAM normally used, to minimize the display RAM and to use the functions and capabilities of the MPU to a greater extent.

The first eighteen buffer RAMs 39A through 39R (only three of which are illustrated for simplicity) are utilized to receive address data as to which, if any, of the sixty four characters stored in 64 character ROMs 28 are to be displayed in each of the eighteen pixels being operated upon. The remaining seven buffer RAMs 39S through 39Y receive data as to various other functions including color of characters, window address, color of window, height and width of characters, enable and timing signals, etc. In each of the first eighteen RAMs 39A/ 40A through 39R/40R, the first six bits of storage are for an ASKII code address for a selected one of character ROMs 28 and the remaining two bits of storage are for data identifying one of four selected colors for the selected character. Further, the height and/or width of any characters can be doubled, if desired, and these signals are mentioned throughout this disclosure.

Figure 5:
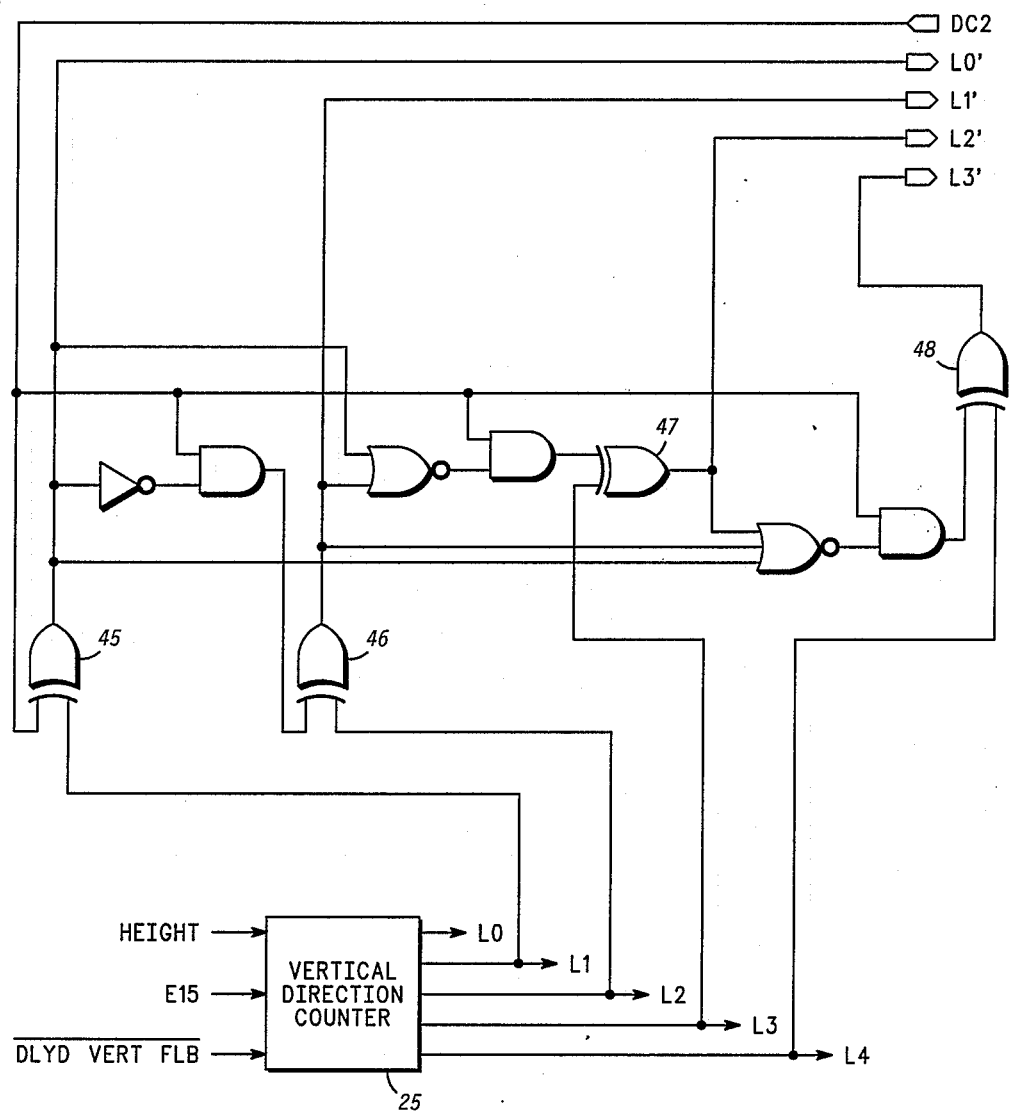
FIG. 5 is a schematic diagram of a half dot timing generator embodied in the vertical counter of FIG. 3.

Referring specifically to FIG. 5, a half dot address generator is shown schematically. Vertical direction counter 25 provides line address signals, L0 to L4, in response to a height signal, a signal from PLL 21 which is synchronized with the horizontal flyback pulses of a received TV signal, and an inverted delayed vertical flyback signal. Line address signals L1 through L4 are applied to inputs of four exclusive OR gates 45, 46, 47 and 48, respectively, along with one bit of a dot address (DC2) and other generated timing signals, to generate half dot address signals L0' to L3'. The half dot addresses are related to the line addresses as follows;

| | |
|---|---|
| DC2 = 0 | L3', L2', L1', L0' = L4, L3, L2, L1 |
| DC2 = 1 | L3', L2', L1', L0' = L4, L3, L2, L1 + 1 |

Here it should be noted that whereas a pixel has been defined as having nine horizontal lines, the half dot addresses actually identify horizontal sweeps (two horizontal sweeps per horizontal line), thereby, generating eighteen vertical addresses for each pixel. The half dot addresses are applied to 64 character ROMs 28 to address data therein each horizontal sweep, rather than each horizontal line. The addressed data in ROMs 28 is applied to half dot shift logic 82, which will be explained in conjunction with FIGS. 6,7 and 8..

Figure 6:
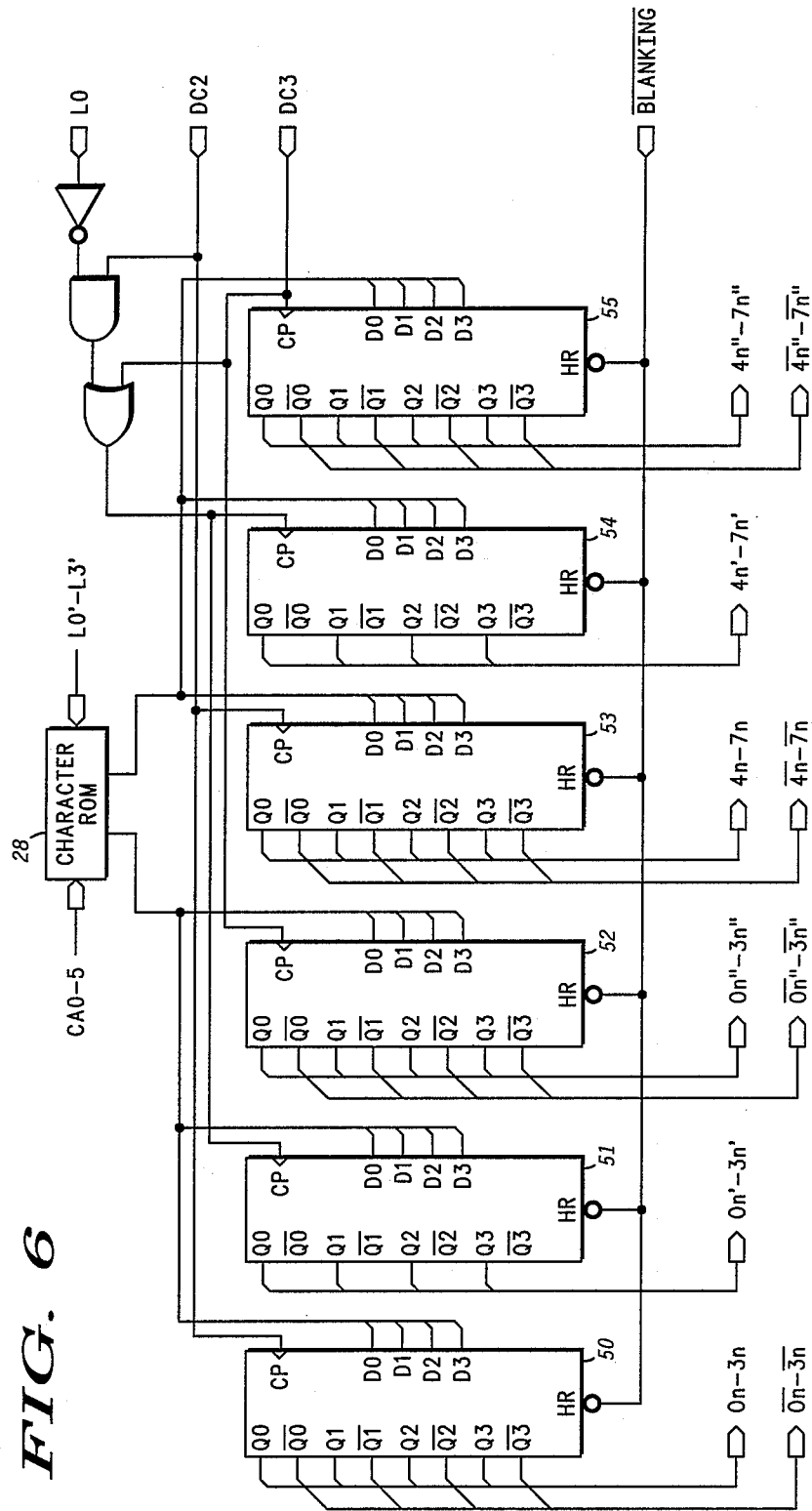
FIGS. 6 and 7 are schematic diagrams of the half dot shift logic and shift register portion of FIG. 3.

Referring to FIG. 6, a specific one of 64 character ROMs 28 selected by address CA0-5 is illustrated, designated as 28 hereafter. The data in ROM 28 is addressed by half dot addresses L0'-L3', and is supplied to the data inputs of a data timing generator including six shift registers 50 through 55. Shift registers 50-55 are reset by a blanking pulse from blanking circuit 33, which is simply u timing signal and, consequently, will not be discussed further. The data is clocked into shift registers 50-55 at different times to provide a sort of time multiplexing, to allow data from different horizontal sweep addresses to be combined in a single horizontal sweep. Shift registers 50 and 58 are clocked by dot address bit DC2, shift registers 52 and 55 are clocked by dot address bit and shift registers 51 and 54 are clocked by a signal from a logic circuit 67 which receives both dot address bits DC2 and DC3 and the most significant bit (L0) in the horizontal line address. The data available at the output terminals of shift registers 50-55 appears in each horizontal sweep in the following order:

| Reg. 50-53 out (n) | Reg. 52-55 out (n'') | Reg. 51-54 out (n') | L3',L2',L1',L0' | | | | |
|---|---|---|---|---|---|---|---|
| 0 | 1 | 0 | 0 | 0 | 0 | 0 = 0 | DC2 = 0 |
| 0 | 1 | 1 | 0 | 0 | 0 | 0 + 1 = 1 | DC2 = 1 |
| 1 | 2 | 1 | 0 | 0 | 0 | 1 = 1 | DC2 = 0 |
| 1 | 2 | 2 | 0 | 0 | 0 | 1 + 1 = 2 | DC2 = 1 |
| 2 | 3 | 2 | 0 | 0 | 1 | 0 = 2 | DC2 = 0 |
| 2 | 3 | 3 | 0 | 0 | 1 | 0 + 1 = 3 | DC2 = 1 |
| 3 | 4 | 3 | 0 | 0 | 1 | 1 = 3 | DC2 = 0 |
| 3 | 4 | 4 | 0 | 0 | 1 | 1 + 1 = 4 | DC2 = 1 |
| 4 | 5 | 4 | 0 | 1 | 0 | 0 = 4 | DC2 = 0 |
| 4 | 5 | 5 | 0 | 1 | 0 | 0 + 1 = 5 | DC2 = 1 |
| 5 | 6 | 5 | 0 | 1 | 0 | 1 = 5 | DC2 = 0 |
| 5 | 6 | 6 | 0 | 1 | 0 | 1 + 1 = 6 | DC2 = 1 |
| 6 | 7 | 6 | 0 | 1 | 1 | 0 = 6 | DC2 = 0 |
| 6 | 7 | 7 | 0 | 1 | 1 | 0 + 1 = 7 | DC2 = 1 |
| 7 | 8 | 7 | 0 | 1 | 1 | 1 = 7 | DC2 = 0 |
| 7 | 8 | 8 | 0 | 1 | 1 | 1 + 1 = 8 | DC2 = 1 |
| 8 | 9 | 8 | 1 | 0 | 0 | 0 = 8 | DC2 = 0 |
| 8 | 9 | 9 | 1 | 0 | 0 | 0 + 1 = 9 | DC2 = 1 |
| 9 | 0 | 9 | 1 | 0 | 0 | 1 = 9 | DC2 = 0 |
| 9 | 0 | 0 | 1 | 0 | 0 | 1 + 1 = 0 | DC2 = 1 |

Figure 7:
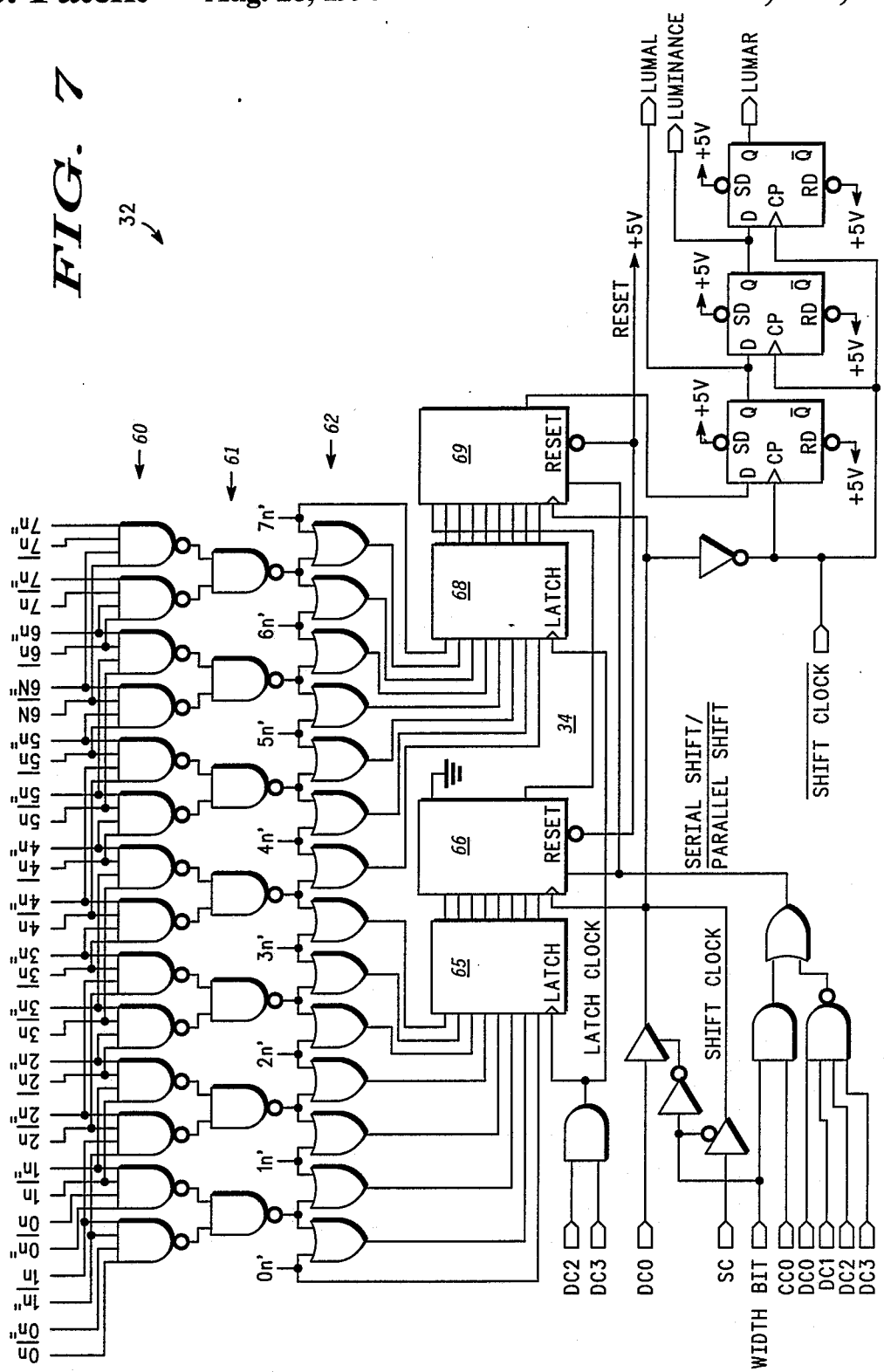

Shift registers 50-55 supply data output signals 0-7 (representing the seven vertical columns in each pixel) in accordance with the timing depicted by n, n' and n'', as well as inverted n and n'', to inputs of half dot shift logic circuitry 32 illustrated in FIG. 7. It should be noted that, essentially, n' indicates the data is used as it was stored, n indicates the data for the previous dot in the same column, while n'' indicates the data for the following dot in the same column.

Circuitry 32 includes a first tier 60 of fourteen NAND gates each of which receives four signals from shift registers 50-55 and adjacent pairs of which supply signals to a second tier 61 of seven NAND gates. The output signals from second tier 81 are supplied, along with signals directly from registers 50-55, to a third tier 62 of fourteen OR gates. The outputs of the first seven OR gates of third tier 62 are applied in parallel to seven inputs of a storage register 65, which outputs are stored and also clocked in parallel into seven inputs of a shift register 66. The outputs of the second seven OR gates of third tier 62 are supplied in parallel to seven inputs of a storage register 68, which outputs are stored and also clocked in parallel into seven inputs of a shift register 69. Upon receiving a shift clock signal, shift registers 66 and 69 shift the received data one bit (one half dot) to the right. The shifted data and the original, or unshifted data, is combined upon receiving a serial shift signal and the data is serially shifted out of registers 66 and 69. So that all of the data appears on a single output line, the data from register 66 is shifted through register 69 and appears at the output thereof. The output data from register 69 is clocked into a flip flop 70 by the shift clock signal and appears at the output thereof as a signal labelled herein LUMAL. The output of flip flop 70 is clocked into a second flip flop 71 by the shift clock signal and the output of flip flop 71 is clocked into a third flip flop 72 by the shift clock signal. The output of flip flop 71 is the luminance signal that is supplied to encoder 35. The output of flip flop 72 is labelled LUMAR and is supplied along with the LUMAL signal to logic circuitry to be explained in conjunction with FIG. 9.

Figure 8A:
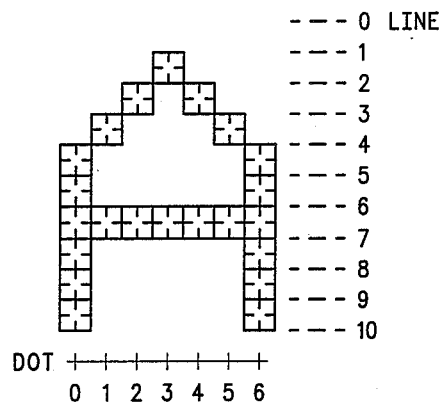
FIGS. 8A through 8E illustrate the manner of smoothing characters.

The operation of half dot shift logic circuitry 32 can best be explained with reference to FIG. 8A through FIG. 8E. Referring to FIG. 8A, the dots for a character ( the letter A) as they are stored in character ROM 28 are illustrated. Note that the character only requires the storage of sixty three bits of data. By utilizing the half dot addresses L0'-L3', in conjunction with character ROM 28 and clocking registers 50-55 on every half dot, the character illustrated in FIG. 8B, in solid lines, can be developed. Essentially the character has been spread to 13×18. To generate the six half dots illustrated in dotted lines in FIG.8B a * function is performed by circuitry 32. Referring to FIG.8C, the practical working of this operation can be seen. In this FIG. the questionable half dot is represented by a cross and previous and following data in adjacent columns are represented by the number of the column and the symbol n or n'', respectively. The rule illustrated in FIG.8C is that a half dot should appear in place of the cross dotted line half dots in FIG.8B) if there is a half dot in the lower left and upper right positions but not in the lower right and upper left positions. Similarly, as illustrated in FIG. 8D, the cross should be filled in with a half dot if there is a half dot in the upper left and lower right positions bu& no: in the upper right and lower left positions.

Figure 8B:
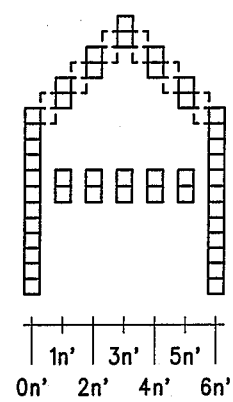
Figure 8C:
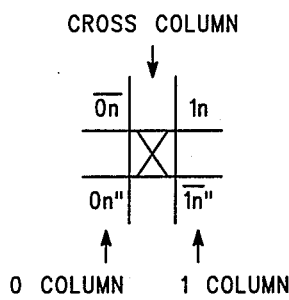
Figure 8D:
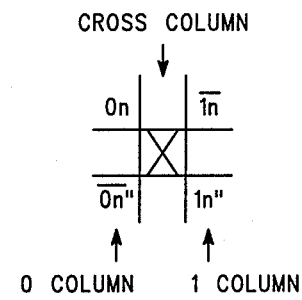

Referring again to FIG. 7, the OR gates of tier 62 and the direct inputs from registers 50-55 provide the character illustrated in FIG. 8B in solid lines. The * operation is performed by the NAND gates of first and second tiers 60 and 61 of FIG. 7. As an example, the first NAND gate (from the left) of tier 60 provides the test of FIG. 8D while the second NAND gate of tier 60 performs the test of FIG. 8C. The results of these tests is then combined (ANDed) in the first AND gate and the results is applied to one input of each of the first and second OR gates (from the left) of tier 62. The outputs of all of the OR gates of tier 62 produce the 13×18 character illustrated by solid and doted lines in FIG.8B. To provide a complete 14×18 character, the entire 13×18 character appearing at the outputs of the OR gates in tier 62 (illustrated in FIG.8B) is shifted one half dot to the right and the new shifted 13×18 character is added to the unshifted 13×18 character by storage registers 65-68 and shift registers 66-69.

Figure 8E:
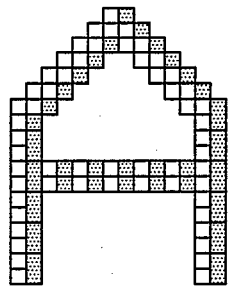

The complete 14×18 character is illustrated in FIG. 8E. The complete character illustrated in FIG. 8E is substantially smoother than the stored character illustrated in FIG. 8A and, consequently, is more pleasing to the eye. It should be noted, that storage of the 14×18 character would require 252 bits of storage area, or approximately four times the area required for the storage of the 7×9 character illustrated in FIG. 8A. Thus, the present invention substantially reduces the storage area required for the 64 characters.

Figure 10:
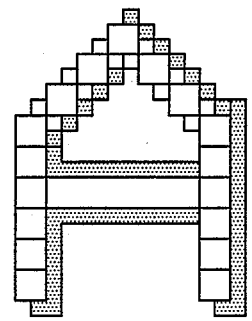
FIG. 10 illustrates the edge enhancing action of the circuit of FIG. 9.
Figure 9:
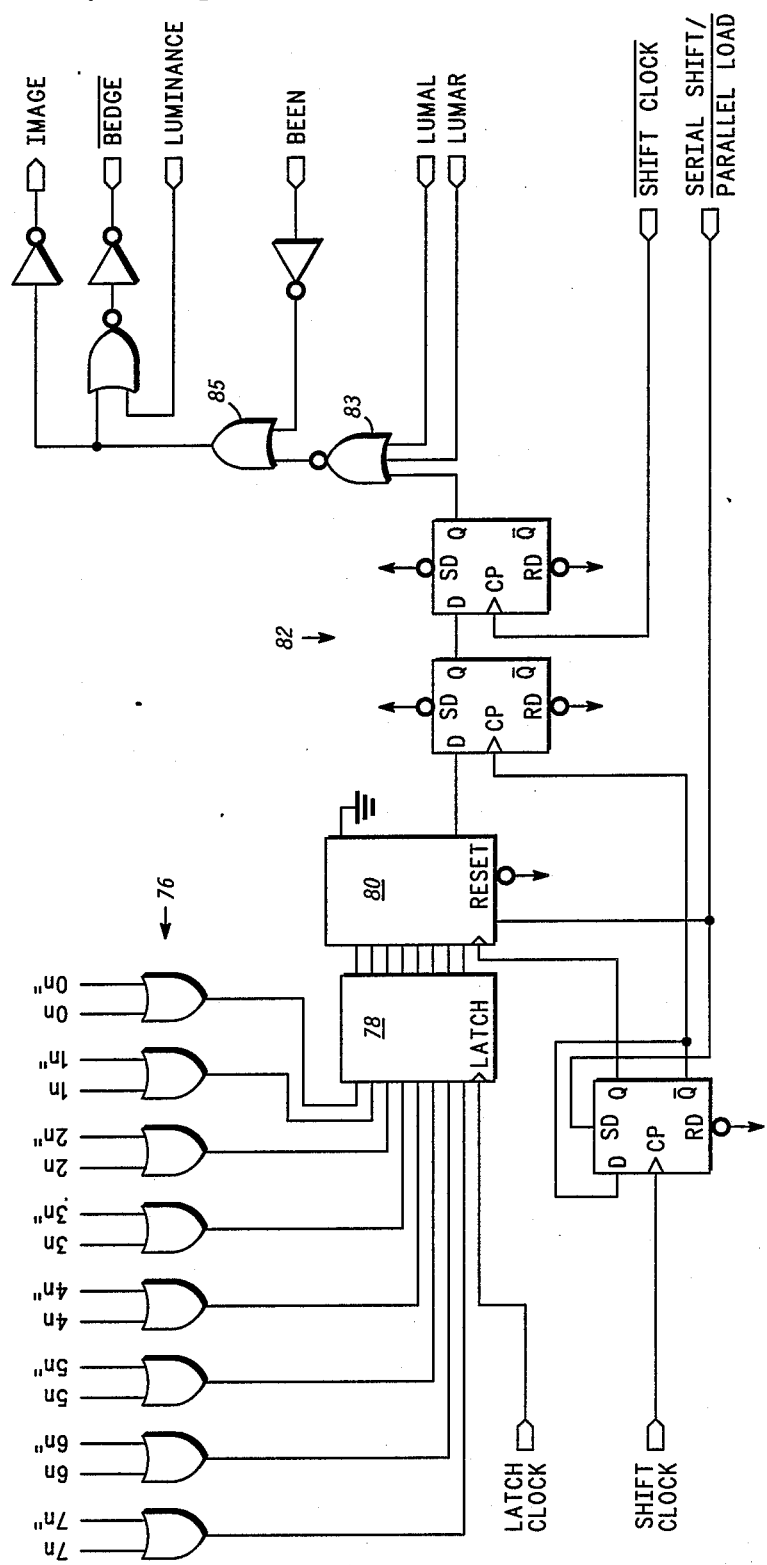
FIG. 9 is a schematic diagram of an edge enhancing circuit embodying the present invention.

Referring specifically to FIG. 9, an edge enhancing circuit 75 is illustrated schematically. The purpose of circuit 75 is to enhance the edges of characters generated by circuits 32 and 34 by, for example, partially surrounding the character with a different color, e.g. black. In the specific embodiment of the present invention illustrated in FIG. 9, circuit 75 provides a half dot black edge at a portion of the top, a portion of the bottom, and along the right edge, so as to produce a shadow effect as though light were coming from a source to the left of the character. To produce this edge enhancing effect, circuit 75 includes eight OR gates in a tier 76, a storage register 78 and a shift register 80. Each of the OR gates in tier 76 is connected to two outputs of registers 50, 52, 53 and 55 so as to receive an indication as to whether there is a half dot above or below (in the same vertical column) the specific half dot being considered. Thus, in each of the 252 positions of the pixel a half dot is generated each time a half dot of the character (for example FIG. 8E) appears above or below one of the positions. These half dots are then applied to the inputs of storage generator 78 and from there to shift register 80 where all of the generated half dots are shifted one half dot to the right. The shifted half dots are supplied through two flip flops 82 and a NOR gate 83 to one input of an OR gate 85. A second input of OR gate 85 is coupled to receive a black edge enable signal, which along with flip flops 82 and NOR gate 83, provide the correct timing to the edge enhancing operation. The output of OR gate 85 is a character having a partial black edge, which character is illustrated in FIG. 10 with the 14×18 character being illustrated in solid lines and the black edge being illustrated in shaded lines. It should be noted that the character generated would require a total of 300 bits of storage area if the character was stored in ROM rather than being generated as in the present invention. Thus, an edge enhancing circuit is described which, in conjunction with the half dot shift logic circuitry, greatly simplifies the edge enhancing operation and reduces the amount of storage required.

Figure 11:
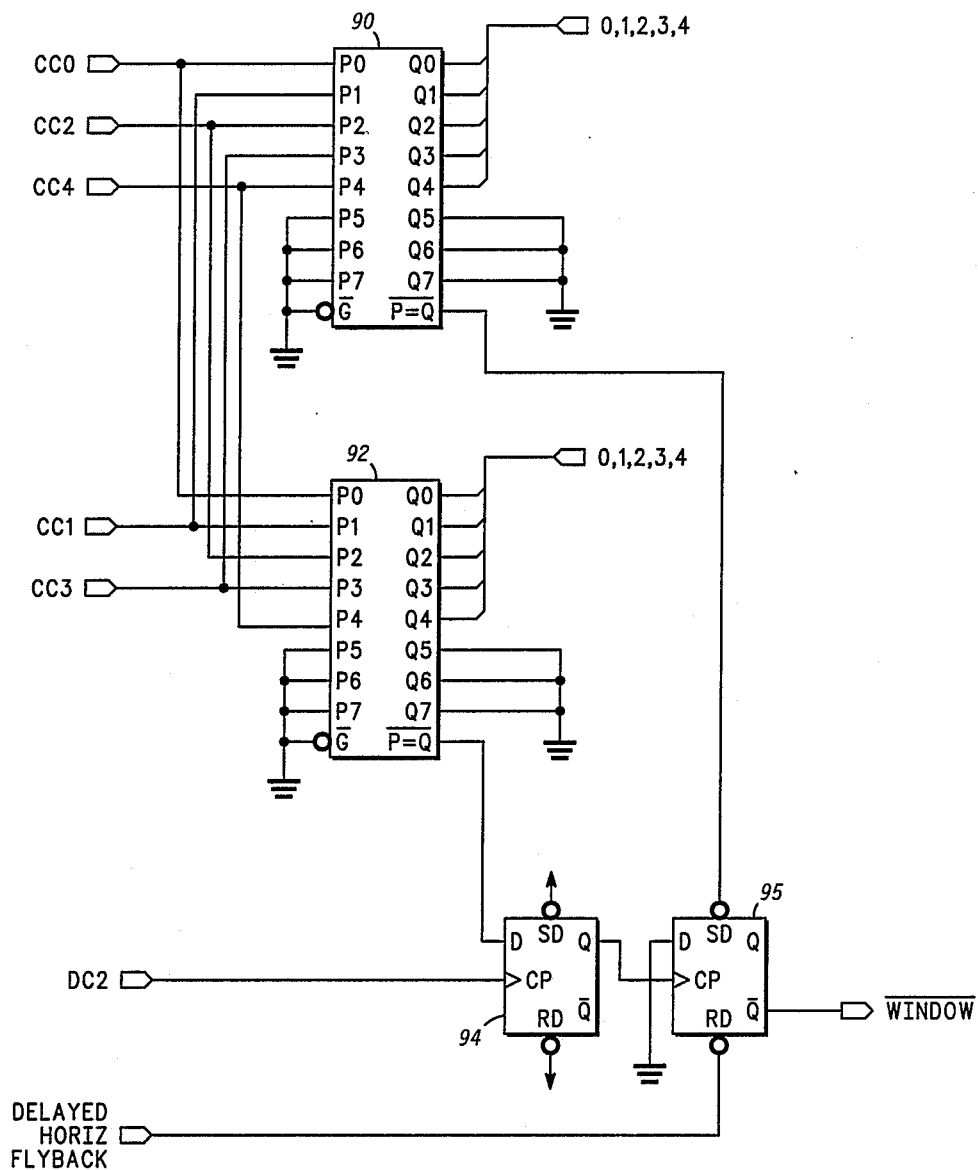
FIG. 11 is a schematic diagram of window generating circuitry portion of FIG. 3.

Referring specifically to FIG. 11, window generator 36 is illustrated schematically and is basically comparison circuitry which includes two comparators 90 and 92 and a switch composed of two flip flops 94 and 95. One set of inputs of each comparator 90 and 92 is connected to receive the column addresses (CC0-4) from horizontal counter 24. A second set of inputs of comparator 90 is connected to storage RAM 40V (see FIG. 4) to receive a window column start address stored therein. A second set of inputs of comparator 92 is connected to storage RAM 40 W to receive a window column stop address stored therein. Window generator 36 operates as follows. In each horizontal sweep of the screen, each column address is compared to the stored window column start address and when a comparison occurs, the switch is turned on to allow DC2 pulses to pass therethrough and window signals are generated. Circuit 36 continues to generate the window signals until a comparison occurs between the column addresses and the stored window column stop address at which time the switch is closed and DC2 pulses are stopped. Inverted output signals from comparators 90 and 92 are supplied to the D input and set terminal of the pair of flip flops 94 and 95, respectively, which operate as the switch to provide the starting and stoping operation. The window signal which is available at the inverted output of flip flop 95 is supplied to an input of encoder 35.

Window generator 36 is an extremely simple circuit to produce and operate. Further, since the window is turned on and off in each vertical column of each horizontal sweep there is no necessity to include circuitry defining the limits of the window in terms of the horizontal rows. It will be clear to those skilled in the art that window generator 86 is capable of generating any size and number of windows (additional storage of stop and start addresses may be required) as well as generating windows within windows.

Thus, character smoothing circuitry is disclosed which is simple to produce and operate. The smoothing circuitry greatly reduces the amount of character storage space required while producing a substantially smooth character. Further the smoothing circuitry can be utilized with an edge enhancing circuit to provide black (or any other color) surround. By using the edge enhancing circuit with the smoothing circuitry, the complexity of the edge enhancing circuit is greatly reduced. Also, a simlified window generator is disclosed, which is capable of providing different colors of window as a background for the characters. This background further enhances the characters to make them more pleasing to the eye and easier to read. It should also be noted that all of the disclosed circuitry is included on the single semiconductor chip 15, although some of the circuits disclosed may be useful in individual circuit form.

While we have shown and described a specific embodiment of this invention, further modifications and improvements will occur to those skilled in the art. We desire it to be understood, therefore, that this invention is no& limited to the particular form shown and we intend in the appended claims to cover all modifications which do not depart from the spirit and scope of this invention.

What we claim is:

1. A television receiver comprising:
   a microprocessor; and
   multistandard on screen display circuitry for generating a preselected display coupled to said microprocessor and including half dot shift means for character smoothing in the display.

2. A television receiver as claimed in claim 1 wherein the half dot shift means includes:
   a plurality of character ROMs each having stored therein character data representing dots in horizontal and vertical lines defining a character to be displayed;
   a half dot address generator;

a data timing generator coupled to said plurality of character ROMs and said half dot address generator and providing first, second and third data outputs for each half dot from a selected character, the second data output being representative of the stored character data for a selected half dot of the selected character, the first data output being representative of the stored character data for a half do& immediately preceeding the selected half dot in a vertical line including the selected half dot, and the third data output being representative of the stored character data for a half dot immediately following the selected half dot in the vertical line including the selected half dot; and half dot shift logic circuitry coupled to receive and combine the first, second and third data outputs from said data timing generator and providing data output signals representative of a substantial portion of the selected character.

3. A television receiver as claimed in claim 2 wherein the half dot shift means further includes shift storage means coupled to said half dot shift logic circuitry for receiving the data output signals, shifting the data output signals one half dot, and combining the received data output signals with the shifted data output signals to provide data output signals representative of the complete selected character.

4. A television receiver as claimed in claim 3 wherein each character ROM has sufficient storage capacity to store character data for an N by M bit character and the complete selected character represented by the data output signals of said shift storage means is a 2N by 2M bit character.

5. A television receiver as claimed in claim 1 wherein the multistandard on screen display circuitry further includes edge generating means coupled to said half dot shift means for at least partially surrounding characters with a predetermined edge.

6. A television receiver as claimed in claim 5 wherein said edge generating means is constructed to produce a shadow effect on each character with &he light appearing to come from a side of the display at which horizontal sweeps begin.

7. A television receiver as claimed in claim 2 including in addition edge generating means with shift storage means coupled to receive the first and third data outputs of said data timing generator for generating edge data including a data bit for each bit in the first and third data outputs and shifting the generated edge data a half dot toward a side of the display at which horizontal sweeps end.

8. A television receiver as claimed in claim 1 including in addition window generating means for providing a window enclosing the preselected display.

9. A television receiver as claimed in claim 7 wherein said multistandard on screen display circuitry generates column timing signals and includes window generating means comprising a storage device for storing information as to the position of the window, the information including the column in each horizontal line at which the window starts and ends, and comparison circuitry coupled to receive stored information from said storage device on first input terminals and further coupled to receive said timing signals from said multistandard on screen display circuitry on second input terminals, said comparison circuitry providing window signals when the information on said first and second input terminals are substantially equal.

10. A television receiver comprising:
a microprocessor; and
on screen display circuitry coupled :o said microprocessor and including generating means for generating dot and column timing signals and window generating means for providing a window enclosing a preselected display, said window generating means including a storage device for storing window Position information including columns in each horizontal line at which the window starts and ends and comparison circuitry coupled to receive stored information from said storage device on first input terminals and further coupled to receive the column timing signals from said generating means on second input terminals, said comparison circuitry providing window signals when information on the first and second input terminals are substantially equal.

11. A television receiver as claimed in claim 10 wherein the comparison circuitry includes:
a first comparator having first input terminals connected to receive the column timing signals, second input terminals connected to receive window position information including columns in each horizontal line at which the window starts, and an inverted output terminal;
a second comparator having first input terminals connected to receive the column timing signals, second input terminals connected to receive window Position information including columns in each horizontal line at which the window ends, and an inverted output terminal; and
a switch including first and second flip flop circuits each having signal input terminals, clock input terminals, set input terminals, and output terminals, the clock input terminal of said first flip flop being adapted to receive the dot timing signals, the signal input terminal of said first flip flop being connected to the inverted output terminal of said second comparator, the output terminal of said first flip flop being connected to the clock input terminal of said second flip flop, the set input terminal of said second flip flop being connected to the inverted output terminal of said first comparator, and the output terminal of said second flip flop providing the window signals.

12. On screen display apparatus for use in conjunction with a television receiver including ha)f dot shift circuitry for character smoothing in a display, said circuitry comprising:
a plurality of character ROMs each having stored therein character data representing dots in horizontal and vertical lines defining a character to be displayed;
a half dot address generator;
a data timing generator coupled to said plurality of character ROMs and said half dot address generator and providing first, second and third data outputs for each half dot from a selected character, the second data output being representative of the stored character data for a selected half dot of the selected character, the first data output being representative of the stored character data for a half dot immediately preceeding the selected half dot in a vertical line including the selected half dot, and the third data output being representative of the stored character data for a half dot immediately following the selected half dot in the vertical line including the selected half dot; and half dot shift logic circuitry coupled to receive and combine the first, second and third data outputs from said data timing generator and providing data output signals representative of a substantial portion of the selected character.

13. On screen display apparatus for use in conjunction with a television receiver including half dot shift circuitry for character rounding in a display as claimed in claim 12 further including shift storage means coupled to said half dot shift logic circuitry for receiving the data output signals, shifting the data output signals one half dot, and combining the received data output signals with the shifted data output signals to provide data output signals representative of the complete selected character.

14. In a television receiver including multistandard on screen display circuitry, a method of character smoothing comprising the steps of:

storing character data representing dots in horizontal and vertical lines defining a character to be displayed;

developing a set of half dot addresses;

generating first, second and third data signals for each half dot from a selected character from said stored character data, the second data signal being representative of the stored character data for a selected half dot of the selected character, the first data signal being representative of the stored character data for a half dot immediately preceeding the selected half dot in a vertical line including the selected half dot, and the third data signal being representative of the stored character data for a half dot immediately following the selected half dot in the vertical line including the selected half dot; and combining the first, second and third data signals to provide data output signals representative of the selected character in a smooth form.

15. A method as claimed in claim 14 wherein the step of combining includes the steps of logically combining the first, second and third data signals to produce composite data signals representative of approximately one half of the selected character, shifting the composite data signals one half dot to the right, and combining the composite data signals and the shifted data signals to produce a final data signal representative of the selected character in a smooth form.

16. A method of generating a window for an on screen display in the screen of a television receiver comprising the steps of:

generating timing signals for each vertical column of the screen;

providing address signals for the columns in which the window is to appear;

comparing the timing signals to the address signals and providing window signals when timing signals are substantially equal to the address signals for the columns in which the window is to appear; and utilizing the window signals to generate a window in the screen.

* * * * *

UNITED STATES PATENT AND TRADEMARK OFFICE
CERTIFICATE OF CORRECTION

PATENT NO. : 4,953,027

DATED : August 28, 1990

INVENTOR(S) : Hing Y. Tong, Tak M. Kwan, Gerald K. Lunn

It is certified that error appears in the above-identified patent and that said Letters Patent is hereby corrected as shown below:

In column 9, line 9, claim 2, delete "do&" and insert therefor --dot--.

In column 9, line 41, claim 6, delete "&he" and insert therefor --the--.

In column 10, line 9, claim 10, delete "Position" and insert therefor --position--.

In column 10, line 30, claim 11, delete "Position" and insert therefor --position--.

In column 10, line 48, claim 12, delete "ha)f" and insert therefor --half--.

Signed and Sealed this

Second Day of June, 1992

Attest:

DOUGLAS B. COMER

*Attesting Officer*    *Acting Commissioner of Patents and Trademarks*